United States Patent
Kojima (10) Patent No.: US 11,421,119 B2
(45) Date of Patent: *Aug. 23, 2022

(54) RESIN COMPOSITION, AND THREE-DIMENSIONAL MOULDING PRODUCTION METHOD

(71) Applicant: Konica Minolta, Inc., Tokyo (JP)

(72) Inventor: Takeshi Kojima, Tokyo (JP)

(73) Assignee: KONICA MINOLTA, INC., Tokyo (JP)

(*) Notice: Subject to any disclaimer, the term of this patent is extended or adjusted under 35 U.S.C. 154(b) by 541 days.

This patent is subject to a terminal disclaimer.

(21) Appl. No.: 16/475,082

(22) PCT Filed: Dec. 5, 2017

(86) PCT No.: PCT/JP2017/043690
§ 371 (c)(1),
(2) Date: Jun. 29, 2019

(87) PCT Pub. No.: WO2018/131333
PCT Pub. Date: Jul. 19, 2018

(65) Prior Publication Data
US 2019/0330484 A1    Oct. 31, 2019

(30) Foreign Application Priority Data

Jan. 12, 2017    (JP) .............................. JP2017-003320

(51) Int. Cl.
*C09D 11/101*    (2014.01)
*B33Y 10/00*    (2015.01)
(Continued)

(52) U.S. Cl.
CPC .......... *C09D 11/101* (2013.01); *B29C 64/124* (2017.08); *B33Y 10/00* (2014.12);
(Continued)

(58) Field of Classification Search
CPC ... C09D 11/101; C09D 11/107; B29C 64/124; B29C 64/20; B33Y 10/00; B33Y 70/00; B29K 2401/00; B29K 2405/00
See application file for complete search history.

(56) References Cited

U.S. PATENT DOCUMENTS

| | | | | |
|---|---|---|---|---|
| 2016/0089720 A1* | 3/2016 | Kamakura | ............... | B22F 12/00 419/53 |
| 2017/0232684 A1* | 8/2017 | Yoshimura | ............... | C08K 3/34 264/308 |
| 2018/0022024 A1* | 1/2018 | Saito | ........................ | B29B 9/16 264/482 |
| 2021/0213533 A1* | 7/2021 | Miyashita | ............... | B22F 10/20 |

FOREIGN PATENT DOCUMENTS

| | | | |
|---|---|---|---|
| JP | S56-144478 U | 10/1981 | |
| JP | S56-144478 A | 11/1981 | |

(Continued)

OTHER PUBLICATIONS

International Search Report dated Feb. 27, 2018 for PCT/JP2017/043690 and English translation.

*Primary Examiner* — Michael M. Robinson
(74) *Attorney, Agent, or Firm* — Lucas & Mercanti, LLP (57) ABSTRACT

The purpose of the present invention is to provide a liquid resin composition which includes polysaccharide nanofibres, and which is used in a three-dimensional moulding production method in which a moulding obtained by curing the resin composition by irradiating the resin composition with active energy rays is three-dimensionally formed, wherein unevenness in strength in the height direction is not readily produced in the formed three-dimensional moulding. The present invention relates to a liquid resin composition which is used to produce a three-dimensional moulding, and which three-dimensionally forms a moulding as a result of being cured by being selectively irradiated with active energy rays. The resin composition includes an active energy ray-curable compound and polysaccharide nanofi- (Continued)

bres. The ratio of the number of polysaccharide nanofibres having a branched structure to the total number of polysaccharide nanofibres is less than 20%.

13 Claims, 3 Drawing Sheets

(51) Int. Cl.
*B33Y 70/00* (2020.01)
*B29C 64/124* (2017.01)
*C09D 11/107* (2014.01)
*B33Y 30/00* (2015.01)
*B29C 64/20* (2017.01)
*B29K 401/00* (2006.01)

(52) U.S. Cl.
CPC ............ *B33Y 70/00* (2014.12); *C09D 11/107* (2013.01); *B29C 64/20* (2017.08); *B29K 2401/00* (2013.01); *B29K 2405/00* (2013.01); *B33Y 30/00* (2014.12)

(56) References Cited

FOREIGN PATENT DOCUMENTS

| | | |
|---|---|---|
| JP | H06-170954 A | 6/1994 |
| JP | 2015089943 A | 5/2015 |
| JP | 2016509963 A | 4/2016 |
| JP | 2016153470 A | 8/2016 |

* cited by examiner

RESIN COMPOSITION, AND THREE-DIMENSIONAL MOULDING PRODUCTION METHOD

CROSS REFERENCE TO RELATED APPLICATION

This Application is a 371 of PCT/JP2017/043690 filed on Dec. 5, 2017 which, in turn, claimed the priority of Japanese Patent Application No. 2017-003320 filed on Jan. 12, 2017, both applications are incorporated herein by reference.

TECHNICAL FIELD

The present invention relates to a resin composition and a production method for a three-dimensional shaped article.

BACKGROUND ART

Various methods have been recently developed which can relatively easily produce a three-dimensional shaped article having a complicated shape. One known method for producing a three-dimensional shaped article is a method for three-dimensionally forming a shaped article that is obtained by irradiating a liquid resin composition with an active energy ray to thereby cure the resin composition.

For example, PTL 1 describes a method for forming a three-dimensional shaped article, including selectively irradiating a surface section of a liquid resin composition with an active energy ray in a shaping tank, and depositing a layer cured of the resin composition.

PTL 2 describes a method for forming a three-dimensional shaped article, including selectively irradiating the vicinity of the bottom of a liquid resin composition, with an active energy ray in a shaping tank, to thereby three-dimensionally and continuously cure the resin composition.

A technique for an enhancement in mechanical properties of a shaped article to be thus produced is known which includes adding a filler to the resin composition.

For example, PTL 3 describes mixing of a glass fiber as a reinforcing material with the above resin composition and thus an enhancement in impact resistance of a three-dimensional shaped article to be formed.

PTL 4 describes the above resin composition which, if including an inorganic filler such as silica, can be suppressed in deterioration in viscosity stability of the resin composition due to the inorganic filler which includes a nanoparticle to thereby allow for light scattering and curing of the resin composition.

PTL 5 describes a resin composition to be molded in a mold, in which the resin composition includes a nanofiber such as cellulose to result in an enhancement in strength of a molded product.

CITATION LIST

Patent Literatures

PTL 1
Japanese Patent Application Laid-Open No. S56-144478
PTL 2
Japanese Unexamined Patent Application Publication (Translation of PCT Application) No. 2016-509963
PTL 3
Japanese Patent Application Laid-Open No. H06-170954
PTL 4
Japanese Patent Application Laid-Open No. 2015-89943
PTL 5
Japanese Patent Application Laid-Open No. 2016-153470

SUMMARY OF INVENTION

Technical Problem

The production of a three-dimensional shaped article by irradiation of a resin composition with an active energy ray, as described in PTL 1 and PTL 2, can also be expected to lead to an enhancement in strength of a three-dimensional shaped article to be produced, with an increase in the viscosity of the resin composition due to addition of nano-sized fiber-shaped polysaccharide (hereinafter, also simply referred to as "polysaccharide nanofiber".) to the resin composition being suppressed and thus a reduction in the rate of three-dimensional shaping and a reduction in the accuracy of the three-dimensional shaped article being suppressed, as described in PTL 4 and PTL 5.

According to findings by the present inventors, however, a resin composition including a polysaccharide nanofiber may cause aggregation and settlement of a part of the polysaccharide nanofiber in some cases. Thus, addition of a polysaccharide nanofiber to a resin composition in the method for producing a three-dimensional shaped article as described in PTL 1 and PTL 2 causes the concentration distribution in the depth direction, of the polysaccharide nanofiber in the resin composition, to be changed during shaping or the like, resulting in the concentration distribution of the polysaccharide nanofiber in the height direction of a three-dimensional shaped article formed. The concentration distribution of the polysaccharide nanofiber may cause the variation in strength in the height direction of the three-dimensional shaped article to occur, thereby not enabling the three-dimensional shaped article to exhibit a desired strength.

For example, in the case where the surface section of the resin composition is being cured as described in PTL 1, the upper section of a three-dimensional shaped article having the resin composition cured where the polysaccharide nanofiber is also included in the surface section is increased in strength to a desired extent, immediately after the initiation of three-dimensional shaping. On the other hand, the lower section of a three-dimensional shaped article having the resin composition cured where aggregation and settlement of the polysaccharide nanofiber are made after a lapse of time from the initiation of three-dimensional shaping and the polysaccharide nanofiber included in the surface section is decreased may not be so increased in strength in some cases.

In the case where the resin composition is cured by light exposure from the bottom surface of the shaping tank as described in PTL 2, the upper section of a three-dimensional shaped article having the resin composition cured in the vicinity of the bottom surface before settlement of the polysaccharide nanofiber is increased in strength to a desired extent, immediately after the initiation of three-dimensional shaping. However, the lower section of a three-dimensional shaped article having the resin composition cured where aggregation and settlement of the polysaccharide nanofiber are made after a lapse of time from the initiation of three-dimensional shaping and the polysaccharide nanofiber included in the bottom surface is increased may be excessively enhanced in strength in some cases.

The three-dimensional shaped article may be used in a trial product, a mechanical component, and the like, and is demanded to exhibit any strength depending on applications. Thus, a three-dimensional shaped article with any variation in strength caused in the height direction thereof cannot be used in a desired application in some cases.

The present invention has been made in view of the above problems, and an object thereof is to provide a resin composition for use in a method for producing a three-dimensional shaped article, the method including irradiating a liquid resin composition including a polysaccharide nanofiber with an active energy ray, to three-dimensionally form a shaped article having the resin composition cured, in which the three-dimensional shaped article formed hardly causes the variation in strength in the height direction to occur, and a production method for a three-dimensional shaped article by use of such a resin composition.

Solution to Problem

The problems mentioned above are to be solved by the following means.

[1] A resin composition to be used in production of a three-dimensional shaped article, the production including selectively irradiating a liquid resin composition with an active energy ray, thereby three-dimensionally forming a shaped article having the resin composition cured, wherein the resin composition comprises an active energy ray-curable compound and a polysaccharide nanofiber, and includes a branch-structured polysaccharide nanofiber at a percentage of less than 20% on a number basis based on a total of the polysaccharide nanofiber.

[2] The resin composition according to [1], wherein the resin composition includes the branch-structured polysaccharide nanofiber at a percentage of less than 10% on a number basis relative to the total of the polysaccharide nanofiber.

[3] The resin composition according to [1] or [2], wherein the polysaccharide nanofiber has an average fiber size of 2 nm or more and 100 nm or less.

[4] The resin composition according to any one of [1] to [3], wherein the polysaccharide nanofiber has an average fiber length of 0.2 μm or more and 100 μm or less.

[5] The resin composition according to any one of [1] to [4], wherein the polysaccharide nanofiber has an aspect ratio of 10 or more and 10,000 or less.

[6] The resin composition according to any one of [1] to [5], wherein a percentage of a mass of the nanofiber based on a total mass of the active energy ray-curable compound is 0.05 mass % or more and 90 mass % or less.

[7] The resin composition according to any one of [1] to [6], wherein the polysaccharide nanofiber comprises nanocellulose.

[8] The resin composition according to [7], wherein the nanocellulose comprises a cellulose nanofiber.

[9] The resin composition according to [7], wherein the nanocellulose comprises a cellulose nanocrystal.

[10] A production method for a three-dimensional shaped article, the method comprising selectively irradiating the resin composition according to any one of [1] to [9] with an active energy ray, thereby three-dimensionally forming a shaped article having the resin composition cured.

[11] The production method according to [10], the method comprising:

selectively irradiating the resin composition with an active energy ray, thereby forming a first shaped article layer, in a shaping tank, feeding the resin composition onto a surface of the first shaped article layer, selectively irradiating the resin composition fed, with an active energy ray, thereby forming a second shaped article layer having the fed resin composition cured, and depositing the second shaped article layer on the first shaped article layer, and repeating feeding of the resin composition and deposition of the shaped article layer, thereby three-dimensionally forming a shaped article having the resin cured.

[12] The production method according to [10], the method comprising allowing an active energy ray to pass through a buffer region in which curing of the resin composition is inhibited by a polymerization inhibitor, and selectively irradiating a curing region which has a lower concentration of the polymerization inhibitor and in which the resin composition is curable, with the active energy ray, thereby curing the resin composition contained in the curing region, in a shaping tank, and continuously irradiating the resin composition cured, with the active energy ray, with the resin composition cured being transferred in a vertical direction in the shaping tank, thereby three-dimensionally and continuously forming a shaped article having the resin composition cured.

[13] The production method according to [12], wherein the curing region is irradiated with the active energy ray from a bottom surface of the shaping tank.

Advantageous Effects of Invention

The present invention provides a resin composition for use in a production method for a three-dimensional shaped article, the method including irradiating a liquid resin composition including a polysaccharide nanofiber with an active energy ray, to three-dimensionally form a shaped article having the resin composition cured, in which the three-dimensional shaped article formed hardly causes the variation in strength in the height direction to occur, and a production method for a three-dimensional shaped article by use of such a resin composition.

DESCRIPTION OF EMBODIMENTS

The present inventors have made intensive studies in view of the above problems, and have found that a branch-structured polysaccharide nanofiber in the polysaccharide nanofiber included in the liquid resin composition is easily settled in the resin composition. The present inventors have made further experiments and studies based on the above findings, and have completed a resin composition that is reduced in amount of a branch-structured polysaccharide nanofiber, thereby allowing the concentration distribution in the depth direction, of the polysaccharide nanofiber in the resin composition, to be hardly changed, and also hardly causing the variation in strength in the height direction of a three-dimensional shaped article to be formed, to occur.

One aspect of the present invention based on the above concept relates to a resin composition to be used in production of a three-dimensional shaped article, the production including selectively irradiating a liquid resin composition with an active energy ray, thereby three-dimensionally forming a shaped article having the resin composition cured. The resin composition contains an active energy ray-curable compound and a polysaccharide nanofiber, and has a branch-structured polysaccharide nanofiber at a percentage of less than 20% on a number basis relative to the total of the polysaccharide nanofiber.

1. Resin Composition

The resin composition contains an active energy ray-curable compound and a polysaccharide nanofiber.

1-1. Active Energy Ray-Curable Compound

The active energy ray-curable compound may be any liquid compound as long as such a liquid compound is to be polymerized and crosslinked, and cured by irradiation with an active energy ray.

The active energy ray may be any energy ray that can allow the liquid compound to be polymerized and crosslinked, and thus cured. Examples of the active energy ray include ultraviolet light, X-ray, electron beam, and y-ray. The active energy ray may also be visible light as long as the compound can be cured.

Examples of the active energy ray-curable compound include a radical polymerizable compound and a cationic polymerizable compound. The photocurable compound may be a monomer, a polymerizable oligomer, a prepolymer, or a mixture thereof. The active energy ray-curable compound may be included singly or in combinations of two or more kinds thereof in the resin composition.

The radical polymerizable compound is preferably an unsaturated carboxylate compound, preferably a compound having an ethylene group, a propenyl group, a butenyl group, a vinyl phenyl group, a (meth)acryloyl group, an allyl ether group, a vinyl ether group, a maleyl group, a maleimide group, a (meth)acrylamide group, an acetylvinyl group, or a vinyl amide group, more preferably (meth)acrylate. The radical polymerizable compound may be included singly or in combinations of two or more kinds thereof in the resin composition. In the present invention, the "(meth)acryloyl group" means an acryloyl group or a methacryloyl group, the "(meth)acryl" means acryl or methacryl, and the "(meth)acrylate" means acrylate or methacrylate.

Examples of the (meth)acrylate include monofunctional (meth)acrylates including isoamyl (meth)acrylate, stearyl (meth)acrylate, lauryl (meth)acrylate, butyl (meth)acrylate, pentyl (meth)acrylate, octyl (meth)acrylate, isooctyl (meth)acrylate, isononyl (meth)acrylate, decyl (meth)acrylate, isodecyl (meth)acrylate, tridecyl (meth)acrylate, isomyristyl (meth)acrylate, isostearyl (meth)acrylate, dicyclopentenyloxyethyl (meth)acrylate, dicyclopentenyl (meth)acrylate, 2-ethylhexyl (meth)acrylate, dimethylaminoethyl (meth)acrylate, diethylaminoethyl (meth)acrylate, 2-ethylhexyldiglycol (meth)acrylate, 2-(meth)acryloyloxyethylhexahydrophthalic acid, methoxyethoxyethyl (meth)acrylate, butoxyethyl (meth)acrylate, ethoxydiethylene glycol (meth)acrylate, methoxydiethylene glycol (meth)acrylate, methoxypolyethylene glycol (meth)acrylate, methoxypropylene glycol (meth)acrylate, phenoxyethyl (meth)acrylate, pentachlorophenyl (meth)acrylate, pentabromophenyl (meth)acrylate, tetrahydrofurfuryl (meth)acrylate, dicyclopentanyl (meth)acrylate, cyclohexyl (meth)acrylate, isobornyl (meth)acrylate, (meth)acryloylmorpholine, polyethylene glycol mono(meth)acrylate, polypropylene glycol mono(meth)acrylate, glycerin (meth)acrylate, 7-amino-3,7-dimethyloctyl (meth)acrylate, 2-hydroxyethyl (meth)acrylate, 2-hydroxypropyl (meth)acrylate, 2-hydroxybutyl (meth)acrylate, 2-hydroxy-3-phenoxypropyl (meth)acrylate, benzyl (meth)acrylate, 2-(2-ethoxyethoxy)ethyl (meth)acrylate, 2-ethylhexylcarbitol (meth)acrylate, 2-(meth)acryloyloxyethylsuccinic acid, 2-(meth)acryloyloxyethylphthalic acid, 2-(meth)acryloyloxyethyl-2-hydroxyethyl-phthalic acid, 2-(meth)acryloyloxyethylhexahydrophthalic acid, and t-butylcyclohexyl (meth)acrylate, bifunctional acrylates including triethylene glycol di(meth)acrylate, tetraethylene glycol di(meth)acrylate, polyethylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, cyclohexane di(meth)acrylate, cyclohexane dimethanol di(meth)acrylate, neopentyl glycol di(meth)acrylate, tricyclodecanediyldimethylene di(meth)acrylate, dimethylol-tricyclodecane di(meth)acrylate, polyester di(meth)acrylate, a PO adduct di(meth)acrylate of bisphenol A, hydroxypivalic acid neopentyl glycol di(meth)acrylate, polytetramethylene glycol di(meth)acrylate, polyethylene glycol di(meth)acrylate, tripropylene glycol di(meth)acrylate, and tricyclodecane dimethanol di(meth)acrylate, and tri- or higher functional acrylates including trimethylolpropane tri(meth)acrylate, pentaerythritol tri(meth)acrylate, pentaerythritol tetra(meth)acrylate, dipentaerythritol penta(meth)acrylate, dipentaerythritol hexa(meth)acrylate, ditrimethylolpropane tetra(meth)acrylate, dipentaerythritol monohydroxy penta(meth)acrylate, glycerin propoxy tri(meth)acrylate, and pentaerythritol ethoxy tetra(meth)acrylate.

The (meth)acrylate may also be a modified product. Examples of the (meth)acrylate as a modified product include ethylene oxide-modified (meth)acrylates including triethylene ethylene glycol diacrylate, polyethylene glycol diacrylate, ethylene oxide-modified trimethylolpropane tri(meth)acrylate, ethylene oxide-modified pentaerythritol tetraacrylate, ethylene oxide-modified bisphenol A di(meth)acrylate, and ethylene oxide-modified nonylphenol (meth)acrylate, ethylene oxide-modified (meth)acrylates including tripropylene ethylene glycol diacrylate, polypropylene glycol diacrylate, propylene oxide-modified trimethylolpropane tri(meth)acrylate, propylene oxide-modified pentaerythritol tetraacrylate, and propylene oxide-modified glycerin tri(meth)acrylate, caprolactone-modified (meth)acrylates including caprolactone-modified trimethylolpropane tri(meth)acrylate, and caprolactam-modified (meth)acrylates including caprolactam-modified dipentaerythritol hexa(meth)acrylate.

The (meth)acrylate may also be a polymerizable oligomer. Examples of the (meth)acrylate as a polymerizable oligomer include a polybutadiene (meth)acrylate oligomer, a polyisoprene (meth)acrylate oligomer, an epoxy (meth)acrylate oligomer, an aliphatic urethane (meth)acrylate oligomer, an aromatic urethane (meth)acrylate oligomer, a polyester (meth)acrylate oligomer, and a linear (meth)acryl oligomer.

Examples of the compound having an allyl ether group include phenyl allyl ether, o-, m-, p-cresol monoallyl ether, biphenyl-2-ol monoallyl ether, biphenyl-4-ol monoallyl ether, butyl allyl ether, cyclohexyl allyl ether, cyclohexanemethanol monoallyl ether, phthalic acid diallyl ether, isophthalic acid diallyl ether, dimethanoltricyclodecane diallyl ether, 1,4-cyclohexane dimethanol diallyl ether, alkylene (having 2 to 5 carbon atoms) glycol diallyl ether, polyethylene glycol diallyl ether, glycerin diallyl ether, trimethylolpropane diallyl ether, pentaerythritol diallyl ether, polyglycerin (having a degree of polymerization of 2 to 5) diallyl ether, trimethylolpropane triallyl ether, glycerin triallyl ether, pentaerythritol tetraallyl ether and tetraallyloxyethane, pentaerythritol triallyl ether, diglycerin triallyl ether, sorbitol triallyl ether, and polyglycerin (having a degree of polymerization of 3 to 13) polyallyl ether.

Examples of the compound having a vinyl ether group include butyl vinyl ether, butyl propenyl ether, butyl butenyl ether, hexyl vinyl ether, 1,4-butanediol divinyl ether, ethylhexyl vinyl ether, phenyl vinyl ether, benzyl vinyl ether, ethylethoxy vinyl ether, acetylethoxyethoxy vinyl ether, cyclohexyl vinyl ether, tricyclodecane vinyl ether, adamantyl vinyl ether, cyclohexanedimethanol divinyl ether, tricyclodecanedimethanol divinyl ether, EO adduct divinyl ether of bisphenol A, cyclohexanediol divinyl ether, cyclopentadiene vinyl ether, norbornyldimethanol divinyl ether, divinyl resorcin, divinyl hydroquinone, ethylene glycol divinyl ether, diethylene glycol divinyl ether, triethylene glycol divinyl ether, propylene glycol divinyl ether, dipropylene glycol vinyl ether, butylene divinyl ether, dibutylene glycol divinyl ether, 4-cyclohexane divinyl ether, oxanorbornene divinyl ether, neopentyl glycol divinyl ether, glycerin trivinyl ether, oxetane divinyl ether, glycerin ethylene oxide adduct trivinyl ether (having a molar number of ethylene oxide added, of 6), trimethylolpropane trivinyl ether, trivinyl ether ethylene oxide adduct trivinyl ether (having a molar number of ethylene oxide added, of 3), pentaerythritol trivinyl ether, ditrimethylolpropane hexavinyl ether, and oxyethylene adducts thereof.

Examples of the compound having a maleimide group include phenylmaleimide, cyclohexylmaleimide, and n-hexylmaleimide.

Examples of the compound having a (meth)acrylamide group include (meth)acrylamide, N,N-dimethyl(meth)acrylamide, N-ethyl(meth)acrylamide, N-isopropyl(meth)acrylamide, N-hydroxyethyl(meth)acrylamide, N-butyl(meth)acrylamide, isobutoxymethyl(meth)acrylamide, diacetone (meth)acrylamide, bismethyleneacrylamide, di(ethyleneoxy)bispropylacrylamide, and tri(ethyleneoxy)bispropylacrylamide.

Examples of the cationic polymerizable compound include an epoxy compound, a vinyl ether compound, and an oxetane compound.

Examples of the epoxy compound include monofunctional epoxy compounds including glycidyl (meth)acrylate, allyl glycidyl ether, 2-ethylhexyl glycidyl ether, phenol (polyethyleneoxy) 5-glycidyl ether, butylphenyl glycidyl ether, hexahydrophthalic acid glycidyl ester, lauryl glycidyl ether, 1,2-epoxycyclohexane, 1,4-epoxycyclohexane, 1,2-epoxy-4-vinylcyclohexane, and norbornene oxide, bifunctional epoxy compounds including ethylene glycol diglycidyl ether, diethylene glycol diglycidyl ether, propylene glycol diglycidyl ether, tripropylene glycol diglycidyl ether, bisphenol A diglycidyl ether, polypropylene glycol #400 diglycidyl ether, neopentyl glycol diglycidyl ether, 4-(2,3-epoxypropan-1-yloxy)-N,N-bis(2,3-epoxypropan-1-yl)-2-methylaniline, glycidyl methacrylate, alkylphenol monoglycidyl ether, 4,4-methylene bis[N,N-bis(oxiranylmethyl) aniline], and 1,6-hexanediol diglycidyl ether, and tri- or higher functional epoxy compounds including polyglycerol triglycidyl ether, glycerin polyglycidyl ether, polyglycerin polyglycidyl ether, 3,4-epoxycyclohexylmethyl 3,4-epoxycyclohexanecarboxylate, s-caprolactone-modified 3,4-epoxycyclohexylmethyl-3,4-epoxycyclohexane carboxylate, sorbitol polyglycidyl ether, and pentaerythritol polyglycidyl ether.

Examples of the oxetane compound include monofunctional oxetane compounds including (3-ethyl-oxetan-3-yl)-methanol, 3-(3-ethyl-oxetan-3-ylmethoxy)-propan-1-ol, 4-(3-ethyl-oxetan-3-ylmethoxy)-butane-1-ol, 3-(3-ethyl-oxetan-3-ylmethoxy)-propan-1,2-diol, 1-(3-ethyl-oxetan-3-ylmethoxy)-propan-2-ol, 1-[2-(3-ethyl-oxetan-3-ylmethoxy)-1-methyl-ethoxy-ethanol, 2-[2-(3-ethyl-oxetan-3-ylmethoxy)-ethoxy]-ethanol xylylene bisoxetane, 3-ethyl-3 [([3-ethyloxetan-3-yl]methoxy]methyl]oxetane, 2-ethylhexyloxetane, 2-(3-oxetanyl)-1-butanol, 3-(2-(2-ethylhexyloxyethyl))-3-ethyloxetane, 3-ethyl-3-(vinyloxymethyl)oxetane, 3-(2-phenoxyethyl)-3-ethyloxetane, and (3-ethyl-3-oxetanyl)methoxymethyl methacrylate, and polyfunctional oxetane compounds including 1,4-benzenedicarboxylic acid bis[(3-ethyl-3-oxetanyl)methyl]ester, 4,4-bis(3-ethyl-3-oxetanyl)methoxymethyl)biphenyl, xylylene bisoxetane, and 3,3'-(oxybismethylene)bis(3-ethyloxetane).

1-2. Polysaccharide Nanofiber

The polysaccharide nanofiber is an aggregate that includes a nanofibril obtained by aggregation of polysaccharide with monosaccharides glycosidically bound and that has an average fiber size of 1,000 nm or less. The polysaccharide nanofiber may include a branch-structured polysaccharide nanofiber.

The polysaccharide nanofiber may be subjected to a hydrophobization treatment such as an acetylation treatment, carboxylation, carboxymethylation, a silane coupling treatment with triethoxysilane, and a polyethylenediamine treatment for the purpose of an enhancement in affinity with the active energy ray-curable compound or a resin obtained by curing of the compound. The polysaccharide nanofiber may also be an untreated polysaccharide nanofiber not subjected to the treatment.

The polysaccharide nanofiber is light, high in strength and low in coefficient of thermal expansion, and thus the three-dimensional shaped article to be formed can be enhanced in the strength and heat resistance with being not significantly changed in weight.

The "branch-structured polysaccharide nanofiber" means the presence of any branched chain that projects laterally relative to a main branch including the nanofibril as a main component.

The polysaccharide nanofiber has an average fiber size of 1,000 nm or less, and thus a three-dimensional shaped article to be produced can be enhanced in strength with an increase in the viscosity of the resin composition due to scattering of the active energy ray for irradiation being suppressed and thus a reduction in the rate of three-dimensional shaping and a reduction in the accuracy of the three-dimensional shaped article being suppressed.

It is noted that the percentage of the branch-structured polysaccharide nanofiber on a number basis based on the total of the polysaccharide nanofiber is less than 20%. As described above, the branch-structured polysaccharide nanofiber is easily settled in the resin composition, and the concentration distribution in the depth direction, of the polysaccharide nanofiber in the resin composition, is changed in shaping to thereby cause the concentration distribution of the polysaccharide nanofiber to easily occur in the height direction of the three-dimensional shaped article formed. The concentration distribution of the polysaccharide nanofiber may cause the variation in strength in the height direction of the three-dimensional shaped article to occur, resulting in no enhancement in strength of the three-dimensional shaped article to an expected extent in some cases. On the contrary, the percentage of the branch-structured polysaccharide nanofiber on a number basis is less than 20%, thereby allowing the concentration distribution in the depth direction, of the polysaccharide nanofiber in the resin composition, to hardly occur, and also allowing the variation in strength in the height direction of the three-dimensional shaped article, derived from the concentration distribution, to hardly occur. The percentage of the branch-structured polysaccharide nanofiber on a number basis is preferably less than 10%, more preferably less than 5% from the above viewpoints. The lower limit of the percentage of the branch-structured polysaccharide nanofiber on a number basis is not particularly limited, and is preferably less than 1%, further preferably 0%.

The average fiber size of the polysaccharide nanofiber is preferably 2 nm or more and 100 nm or less. The average fiber size is 2 nm or more, thereby enabling the strength of the three-dimensional shaped article to be more enhanced. The average fiber size is 100 nm or less, thereby allowing the polysaccharide nanofiber not to excessively enhance the viscosity of the resin composition and allowing the polysaccharide nanofiber to hardly reduce the accuracy of the three-dimensional shaped article. The average fiber size of the polysaccharide nanofiber is more preferably 5 nm or more and 80 nm or less, further preferably 10 nm or more and 70 nm or less, particularly preferably 20 nm or more and 60 nm or less from the above viewpoints.

The average fiber length of the polysaccharide nanofiber is preferably 0.2 μm or more and 100 μm or less. The average fiber length is 0.2 μm or more, resulting in a more enhancement in strength of the three-dimensional shaped article. The average fiber length is 100 μm or less, thereby hardly causing settlement of the polysaccharide nanofiber due to entanglement of the polysaccharide nanofiber to occur. The average fiber length of the polysaccharide nanofiber is more preferably 1 μm or more and 80 μm or less, further preferably 1 μm or more and 60 μm or less, particularly preferably 1 μm or more and 40 μm or less from the above viewpoints.

The aspect ratio of the polysaccharide nanofiber is preferably 10 or more and 10,000 or less. The aspect ratio is 10 or more, resulting in a more enhancement in strength of the three-dimensional shaped article. The aspect ratio is 10,000 or less, thereby hardly causing settlement of the polysaccharide nanofiber due to entanglement of the polysaccharide nanofiber to occur. The aspect ratio of the polysaccharide nanofiber is more preferably 12 or more and 8,000 or less, further preferably 15 or more and 2,000 or less, particularly preferably 18 or more and 800 or less from the above viewpoints.

The presence of any branch structure, and the average fiber size, the average fiber length and the aspect ratio of the nanofiber can be measured by analyzing an image obtained by imaging of the resin composition with a transmission electron microscope (TEM).

Figure 1A:
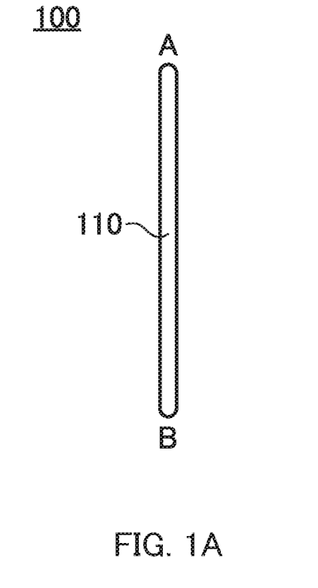
FIG. 1A illustrates a schematic view of a not-branch-structured polysaccharide nanofiber that can be contained in the resin composition of the present invention.
Figure 1B:
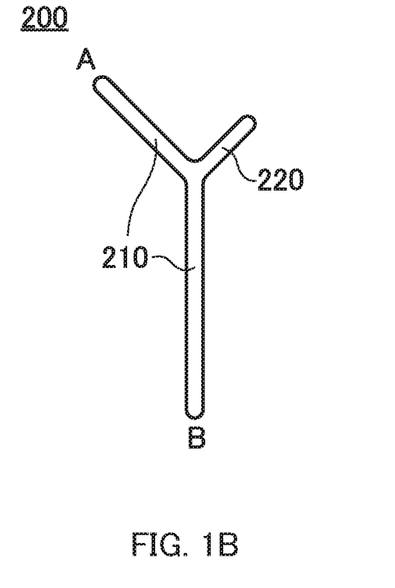
FIG. 1B, FIG. 1C and FIG. 1D each illustrate a schematic view of a branch-structured polysaccharide nanofiber that can be contained in the resin composition of the present invention.
Figure 1C:
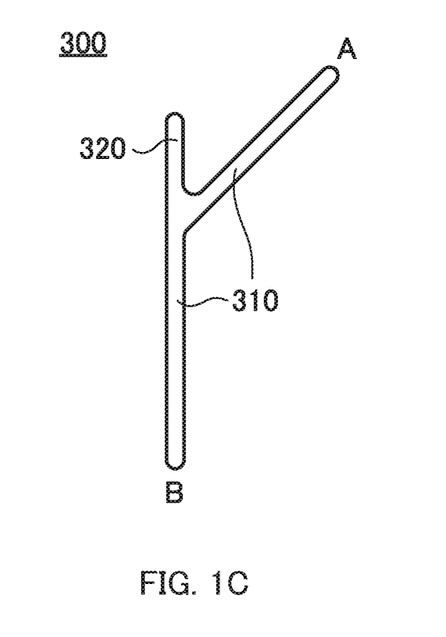
Figure 1D:
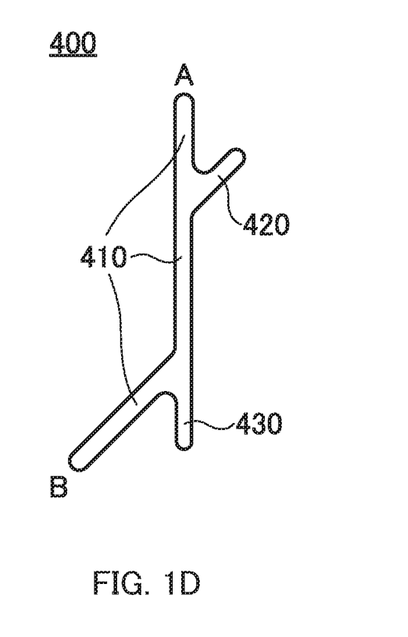

FIG. 1A illustrates a schematic view of not-branch-structured nanofiber 100, and FIG. 1B to FIG. 1D illustrate respective schematic views of branch-structured nanofibers 200, 300 and 400.

Among ends of such nanofibers, a combination of ends, imparting the maximum length as the length of a fiber that connects such ends, is selected, and the fiber that connects such ends is defined as a main branch of the nanofiber. In the case where the nanofiber has a protrusion section that does not form the main branch and that has a length of 50 nm or more, the protrusion section is defined as a side branch and the nanofiber having such a side branch is defined as a branch-structured nanofiber.

Nanofiber 100 illustrated in FIG. 1A has main branch 110 that connects ends A-B, but has no side branch. Nanofiber 200 illustrated in FIG. 1B has main branch 210 that connects ends A-B, and side branch 220. Nanofiber 300 illustrated in FIG. 1C has main branch 310 that connects ends A-B, and side branch 320. Nanofiber 400 illustrated in FIG. 1D has main branch 410 that connects ends A-B, and side branches 420 and 430.

While such respective nanofibers are illustrated in FIG. 1A to FIG. 1D so as to have a substantially linear form for easy understanding, such respective nanofibers usually include a large number of curved sections.

The percentage of the branch-structured nanofiber on a number basis can be obtained by calculating the percentage of the branch-structured nanofiber with respect to 100 nanofibers arbitrarily selected in an image obtained by imaging of the resin composition with TEM.

The fiber size of one nanofiber can be defined as the addition average of the maximum size and the minimum size to be measured from the main branch constituting the nanofiber. The average fiber size of the nanofiber included in the resin composition can be defined as the addition average of the fiber sizes of 100 nanofibers arbitrarily selected in an image obtained by imaging of the resin composition with TEM.

The fiber length of one nanofiber can be defined as the length between ends of a fiber constituting the main branch of the nanofiber (the length between A-B in FIG. 1A to FIG. 1D). The average fiber length of the nanofiber included in the resin composition can be defined as the addition average of the fiber lengths of 100 nanofibers arbitrarily selected in an image obtained by imaging of the resin composition with TEM.

The aspect ratio of one nanofiber can be defined as the value obtained by dividing the fiber length by the fiber size, of the nanofiber. The aspect ratio of the nanofiber included in the resin composition can be defined as the addition average of the aspect ratios of 100 nanofibers arbitrarily selected in an image obtained by imaging of the resin composition with TEM.

The measurement is preferably performed by imaging of a resin composition diluted about 1,000-fold to 10,000-fold with a solvent that is optically transparent and that is non-reactive with any nanofiber, such as methyl ethyl ketone, with TEM so that no nanofibers are overlapped. The magnification of TEM may be adjusted so that 100 or more of nanofibers can be imaged.

The resin composition preferably contains 0.05 mass % or more and 90 mass % or less of the polysaccharide nanofiber based on the total mass of the active energy ray-curable composition. The content of the polysaccharide nanofiber is 0.05 mass % or more, thereby enabling the strength of the three-dimensional shaped article to be more enhanced. The content of the polysaccharide nanofiber is 90 mass % or less, thereby enabling the viscosity of the resin composition not to be excessively enhanced, resulting in easy production of the three-dimensional shaped article, and enabling the polysaccharide nanofiber not to excessively inhibit polymerization and crosslinking of the active energy ray-curable compound, resulting in a more enhancement in accuracy of the three-dimensional shaped article. The content of the polysaccharide nanofiber is preferably 0.1 mass % or more and 70 mass % or less, more preferably 5 mass % or more and 50 mass % or less, further preferably 10 mass % or more and 40 mass % or less from the above viewpoints.

Examples of the polysaccharide include cellulose, hemicellulose, lignocellulose, chitin, and chitosan. In particular, cellulose and chitin are preferable, and cellulose is more preferable from the viewpoint of a more enhancement in strength of the three-dimensional shaped article.

The cellulose nanofiber (hereinafter, also simply referred to as "nanocellulose".) may be a cellulose nanofiber containing, as a main component, a plant-derived fiber or a fibrous nanofibril obtained according to mechanical defibrating of a plant cell wall, biosynthesis by acetic bacteria, an oxidation or electrospinning method with an N-oxyl compound such as 2,2,6,6-tetramethylpiperidine-1-oxyl radical (TEMPO), or the like. The nanocellulose may be a cellulose nanocrystal containing, as a main component, a plant-derived fiber or the nanofibril crystallized in the form of whiskers (the form of needles) obtained according to mechanical defibrating and thereafter an acid treatment of a plant cell wall, or may also have any other form. The nanocellulose may include lignin, hemicellulose, and the like, provided that the nanocellulose contains cellulose as a main component. Any nanocellulose that is not subjected to a delignification treatment and that contains hydrophobic lignin is preferable because such any nanocellulose is high in affinity with the active energy ray-curable compound or a resin obtained by curing of the compound.

The polysaccharide nanofiber may be included singly or in combinations of two or more kinds thereof in the resin composition. The preferable material is preferable because the above effect is exerted as long as the material serves as a main component of the polysaccharide nanofiber. The "polysaccharide nanofiber containing a material as a main component" means that the amount of such a material is 50 mass % or more, preferably 70 mass % or more, more preferably 80 mass % or more, further preferably 90 mass % or more, particularly preferably 99 mass % or more based on the total mass of the polysaccharide nanofiber.

The forms of the polysaccharide nanofiber (including the presence of any branch structure, and the average fiber size, the average fiber length and the aspect ratio) can be adjusted within the above ranges by changing a method for producing the polysaccharide nanofiber to a known method. For example, in the case where the polysaccharide nanofiber is nanocellulose, a defibrating or synthesis method (degree of defibrating, or the like), the number of defibrating operations, and the like may be adjusted. A method for providing a desired shape with respect to each material is determined once, and the polysaccharide nanofiber may be produced according to such a method, from the next time.

1-3. Other Component(s)

The resin composition may contain a photopolymerization initiator. The photopolymerization initiator includes a photo-radical initiator in the case where the active energy ray-curable compound is a compound having a radical polymerizable functional group, and the photopolymerization initiator includes a photo-acid generator in the case where the active energy ray-curable compound is a compound having a cationic polymerizable functional group. The photopolymerization initiator may be included singly or in combinations of two or more kinds thereof in the resin composition. The photopolymerization initiator may be a combination of both a photo-radical initiator and a photo-acid generator.

Examples of the photo-radical initiator include 2-hydroxy-2-methyl-1-phenylpropan-1-one (for example, IRGACURE 1173 manufactured by BASF SE ("IRGACURE" is a registered trademark of the Company)), 2-hydroxy-1-{4-[4-(2-hydroxy-2-methyl-propionyl)-benzyl] phenyl}-2-methyl-propan-1-one (for example, IRGACURE 127 manufactured by BASF SE), 1-[4-(2-hydroxyethoxy)-phenyl]-2-hydroxy-2-methyl-1-propan-1-one (for example, IRGACURE 2959 manufactured by BASF SE), 2,2-dimethoxy-1,2-diphenylethan-1-one (for example, IRGACURE 651 manufactured by BASF SE), Benzil Dimethyl Ketal, 1-(4-isopropylphenyl)-2-hydroxy-2-methylpropan-1-one, 4-(2-hydroxyethoxy)phenyl-(2-hydroxy-2-propyl)ketone, 1-hydroxycyclohexyl-phenyl ketone, 2-methyl-2-morpholino(4-thiomethylphenyl)propan-1-one, 2-benzyl-2-dimethylamino-1-(4-morpholinophenyl)-butanone, benzoin, benzoin methyl ether, benzoin isopropyl ether, diphenyl(2, 4,6-trimethylbenzoyl)phosphine oxide, bis(2,4,6-trimethylbenzoyl)-phenylphosphine oxide, Benzil, methyl phenyl glyoxy ester, benzophenone, o-benzoylbenzoic acid methyl-4-phenylbenzophenone, 4,4'-dichlorobenzophenone, hydroxybenzophenone, 4-benzoyl-4'-methyl-diphenylsulfide, acrylated benzophenone, 3,3',4,4'-tetra(t-butylperoxycarbonyl)benzophenone, 3,3'-dimethyl-4-methoxybenzophenone, 2-isopropylthioxanthone, 2,4-dimethylthioxanthone, 2,4-diethylthioxanthone, 2,4-dichlorothioxanthone, Michler's ketone, 4,4'-diethylaminobenzophenone, 10-butyl-2-chloroacridone, 2-ethylanthraquinone, 9,10-phenanthrenedione, camphorquinone, and 2,4-diethylthioxanthen-9-one.

Examples of the photo-acid generator include a triaryl sulfonium hexafluorophosphate salt, iodonium(4-methylphenyl)(4-(2-methylpropyl)phenyl)hexafluorophosphate, triarylsulfonium hexafluoroantimonate, and 3-methyl-2-butenyltetramethylene sulfonium hexafluoroantimonate.

The content of the photopolymerization initiator may be in any range that enables the resin composition to be sufficiently cured, and can be, for example, 0.01 mass % or more and 10 mass % or less based on the total mass of the resin composition.

The resin composition may contain any known additive(s) such as a photosensitizer, a polymerization inhibitor, an ultraviolet absorber, an antioxidant, a colorant such as a dye and a pigment, a defoaming agent, and a surfactant as long as the three-dimensional shaped article can be formed by irradiation with the active energy ray and no remarkable variation in strength in the height direction is caused in the three-dimensional shaped article formed.

2. Production Method for Three-Dimensional Shaped Article

The liquid resin composition described above can be used for production of a three-dimensional shaped article by three-dimensional formation of a shaped article having the resin composition cured by selective irradiation with an active energy ray.

The shaped article may be formed by depositing a layer formed by curing of the resin composition by the irradiation with an active energy ray (hereinafter, also simply referred to as "deposition shaping method".), or may be continuously formed also in the height direction with the resin composition cured by the irradiation with an active energy ray being transferred in the depth direction (hereinafter, also simply referred to as "continuous shaping method".).

The active energy ray may be any one that can allow an active energy ray-curable compound included in the resin composition to be polymerized and crosslinked for curing of the resin composition, and can be ultraviolet light, X-ray, electron beam, γ-ray, visible light, and the like.

The light source for the irradiation with the active energy ray, which can be used, can be any known one, and, for example, a semiconductor laser, a metal halide lamp, a mercury arc lamp, a xenon arc lamp, a fluorescent lamp, a carbon arc lamp, a tungsten-halogen lamp, and sunlight can be used as the light source for the irradiation with ultraviolet light.

The irradiation with the active energy ray may be made with scanning or by collective light exposure onto a surface. The light source in such collective light exposure can be a spatial light modulator (SLM) projection light system having a SLM such as a crystal liquid panel or a digital mirror device (DMD).

2-1. Deposition Shaping Method

A deposition shaping method can form a three-dimensional shaped article by projecting the active energy ray to the resin composition with a pattern of each layer, included in the data of a cross section obtained by fine division (slicing) in the planar direction, of a three-dimensional shaped article to be produced, thereby forming a shaped article layer constituting the three-dimensional shaped article, and depositing the shaped article layer.

The three-dimensional shaped article can be produced by, for example, selectively irradiating the resin composition with the active energy ray in a shaping tank storing the resin composition, thereby forming a first shaped article layer, feeding the resin composition onto a surface of the first shaped article layer, selectively irradiating the resin composition fed, with the active energy ray, thereby forming a second shaped article layer having the fed resin composition cured, depositing the second shaped article layer on the first shaped article layer, and repeating feeding of the resin composition and deposition of the shaped article layer.

Figure 2:
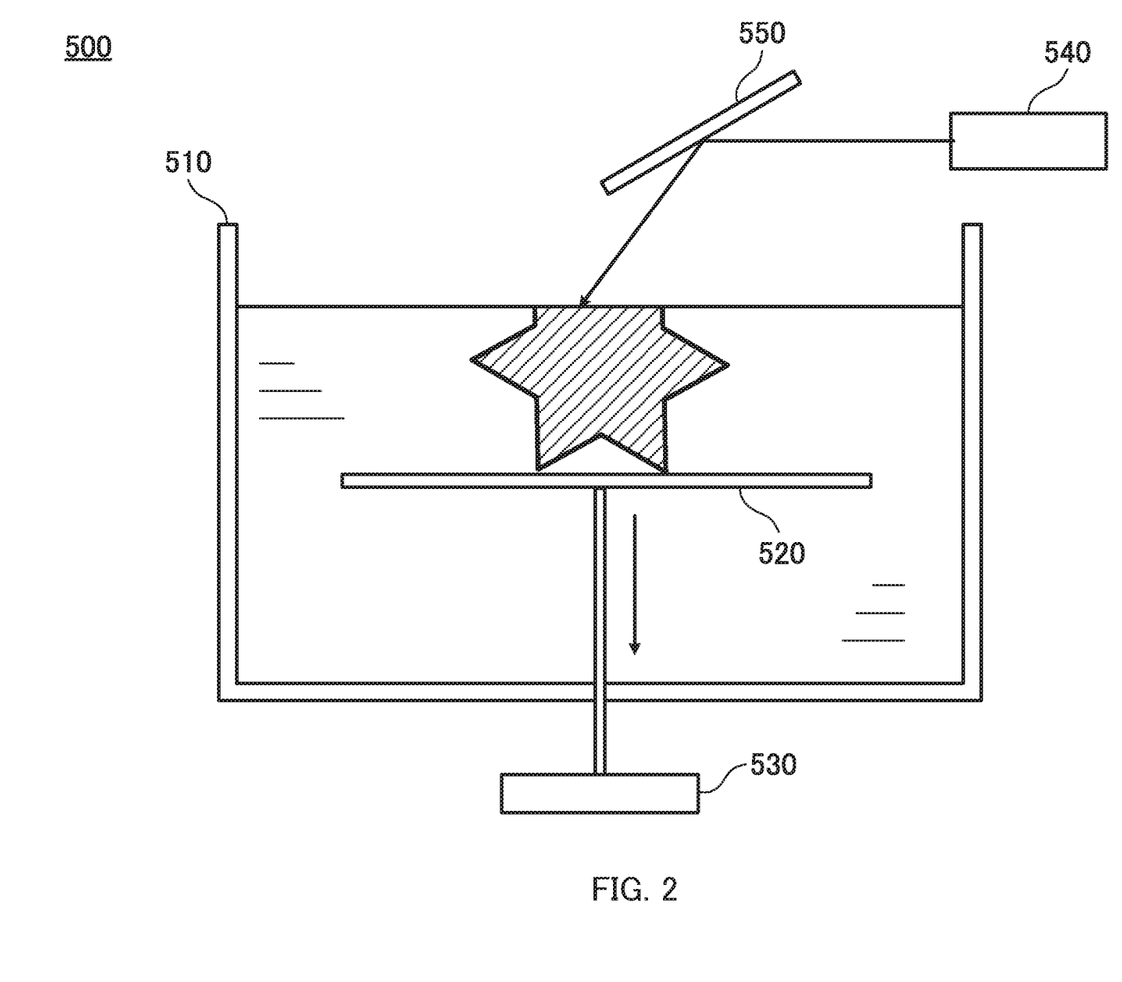
FIG. 2 illustrates a schematic view of an apparatus that produces a three-dimensional shaped article according to one embodiment of the present invention.

FIG. 2 illustrates a schematic view of an example of a production apparatus of a three-dimensional shaped article, for use in the deposition shaping method. Production apparatus 500 includes shaping tank 510 that can store a liquid resin composition, shaping stage 520 that can reciprocate in the depth direction in shaping tank 510, base 530 that supports shaping stage 520, irradiation source 540 with an active energy ray, galvano mirror 550 that guides an active energy ray into shaping tank 510, and the like.

Shaping tank 510 has a size that can allow for reception of a three-dimensional shaped article to be produced. Shaping tank 510 is to be charged with the above liquid resin composition.

Shaping stage 520 is disposed, in the initial state, at a position where the stage is transferred in the depth direction by a thickness corresponding to the thickness of one layer, from the liquid surface of the resin composition.

The active energy ray emitted from irradiation source 540 is here scanned with being guided by galvano mirror 550, and a region of the resin composition covering the surface of shaping stage 520, the region being to constitute a first shaped article layer of the three-dimensional shaped article, is selectively irradiated with the active energy ray, resulting in formation of the first shaped article layer of the three-dimensional shaped article having the resin composition irradiated with the active energy ray cured.

Thereafter, shaping stage 520 is allowed to descend (is transferred in the depth direction) by a thickness corresponding to the thickness of one layer, thereby allowing the first shaped article layer to be sunk in the liquid resin composition. Thus, the resin composition is fed to the surface of the first shaped article layer. Thereafter, the active energy ray emitted from irradiation source 540 is guided by galvano mirror 550 or the like, a region of the resin composition covering the surface of shaping stage 520, the region being to constitute a second shaped article layer of the three-dimensional shaped article, is selectively irradiated with the active energy ray, resulting in formation of the second shaped article layer of the three-dimensional shaped article having the resin composition irradiated with the active energy ray cured, and the second shaped article layer is deposited on the first shaped article layer.

Thereafter, feeding of the resin composition due to descending of shaping stage 520, and deposition of the shaped article layer by irradiation with the active energy ray, are repeated to deposit the shaped article layer having the resin composition cured, thereby resulting in production of a final three-dimensional shaped article.

2-2. Continuous Shaping Method

A continuous shaping method can form a three-dimensional shaped article by projecting the active energy ray to the resin composition with a planar pattern that is to constitute the height in shaping, of a three-dimensional shaped article to be produced, and, at the same time, changing the position in the depth direction, of the resin composition cured by irradiation with the active energy ray.

The continuous shaping method can form a three-dimensional shaped article by, for example, allowing an active energy ray to pass through a buffer region containing the resin composition and a polymerization inhibitor, in which curing of the resin composition is inhibited by the polymerization inhibitor, and selectively irradiating a curing region which has a lower concentration of the polymerization inhibitor and in which the resin composition is curable, with the active energy ray, thereby curing the resin composition contained in the curing region, in a shaping tank storing the resin composition; and continuously irradiating the resin composition cured, with the active energy ray, with the resin composition cured being transferred in the vertical direction in the shaping tank, thereby three-dimensionally and continuously forming a shaped article having the resin composition cured.

Figure 3:
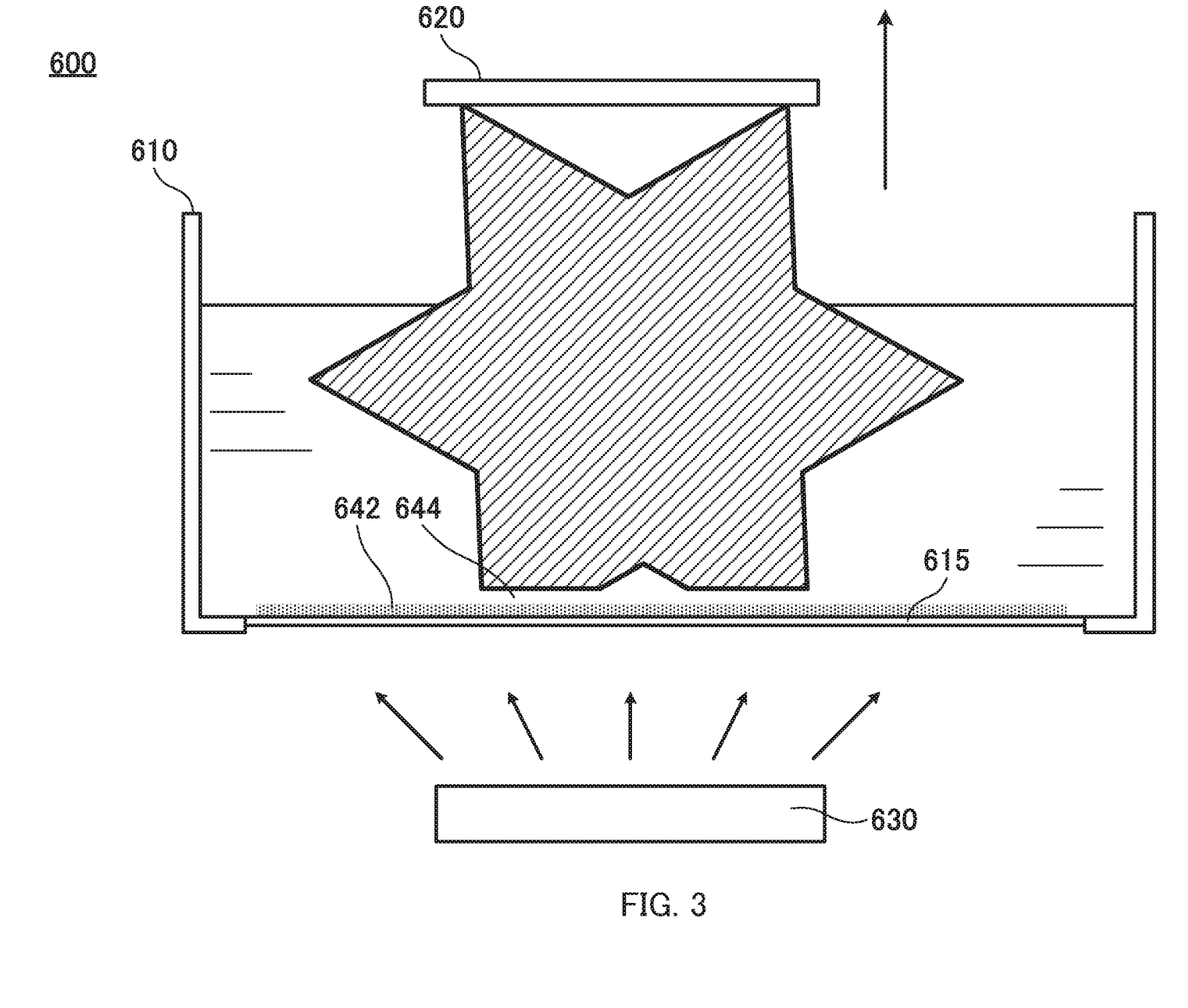
FIG. 3 illustrates a schematic view of an apparatus that produces a three-dimensional shaped article according to another embodiment of the present invention.

FIG. 3 illustrates a schematic view of an example of a production apparatus of a three-dimensional shaped article, for use in the continuous shaping method. Production apparatus 600 includes shaping tank 610 that can store a liquid resin composition, support stage 620 that can reciprocate in the vertical direction (depth direction), irradiation source 630 with an active energy ray, and the like. Shaping tank 610 has, at the bottom thereof, window section 615 which allows actinic radiation to penetrate and allows the polymerization inhibitor to penetrate.

Shaping tank 610 has a broader width than that of a three-dimensional shaped article to be produced. Shaping tank 610 is to be charged with the above liquid resin composition. The resin composition with which shaping tank 610 is charged has buffer region 642 formed on the bottom surface, which contains the polymerization inhibitor penetrating from window section 615 to thereby allow curing of the resin composition to be inhibited by the polymerization inhibitor, resulting in no curing of the resin composition even by irradiation with an active energy ray, and curing region 644 formed which has a lower concentration of the polymerization inhibitor and in which the resin composition is curable by irradiation with an active energy ray.

Support stage 620 is disposed, in the initial state, in the vicinity of the interface of curing region 644 with buffer region 642.

Curing region 644 present on the bottom surface of support stage 620 is selectively irradiated with the active energy ray planarly emitted from irradiation source 630, thereby allowing the resin composition irradiated with the active energy ray to be cured, to thereby form an uppermost section of the three-dimensional shaped article.

Thereafter, support stage 620 is allowed to ascend (is transferred toward a surface in the depth direction), and thus the resin composition is fed to the buffer region (bottom surface) of the resin composition cured. With the resin composition cured being allowed to ascend, a region of the resin composition fed, the region being to constitute a three-dimensional shaped article, is selectively irradiated with the active energy ray emitted from irradiation source 630. Thus, a three-dimensional shaped article having the resin composition irradiated with the active energy ray cured is continuously formed from the uppermost section toward the bottom, resulting in production of a final three-dimensional shaped article.

The polymerization inhibitor may be a known compound that inhibits polymerization and crosslinking of the active energy ray-curable compound, or may be oxygen in the case where the active energy ray-curable compound is a radical polymerizable compound. In the case where the polymerization inhibitor is the known compound, a storage tank that stores the polymerization inhibitor may be provided at a position outside of shaping tank 610 and in contact with window section 615, thereby allowing the polymerization inhibitor to penetrate from the storage tank through window section 615 and allowing the polymerization inhibitor to be fed toward the bottom surface of the shaping tank. On the other hand, in the case where the polymerization inhibitor is oxygen, it is not particularly necessary to provide the storage tank, provided that window section 615 is formed by an oxygen-permeable material.

According to the continuous shaping method, the three-dimensional shaped article does not have any distinct layers, and thus peeling between layers hardly occurs, resulting in a more enhancement in strength in the height direction of the three-dimensional shaped article. According to the continuous shaping method, the three-dimensional shaped article can be produced in a shorter time. Thus, the three-dimensional shaped article can be produced before the occurrence of settlement of the polysaccharide nanofiber, and it is considered that the variation in strength in the height direction of the three-dimensional shaped article due to such settlement of the polysaccharide nanofiber more hardly occurs.

2-3. Others

While the resin composition is irradiated with the active energy ray from the upper surface thereof in the deposition shaping method in the above description, each layer of the three-dimensional shaped article may be formed by irradiation with the active energy ray from the bottom surface of the shaping tank, and a layer formed may be peeled and lifted and the next layer may be formed thereon.

While the resin composition is irradiated with the active energy ray from the bottom surface thereof and the resin composition fed toward the bottom surface is irradiated with the active energy ray with the resin composition cured being allowed to ascend, in the continuous shaping method, the resin composition may be irradiated with the active energy ray from the surface thereof and the resin composition fed toward the bottom surface may be irradiated with the active energy ray with the resin composition cured being allowed to descend.

While the shaped article layers are formed with scanning of the active energy ray in the deposition shaping method, the shaped article layers may be here formed by planar irradiation with the active energy ray. While the resin composition is planarly irradiated with the active energy ray and thus cured in the continuous shaping method, the resin composition may be here cured with scanning of the active energy ray.

EXAMPLES

Hereinafter, the present invention will be described with reference to specific Examples together with Comparative Examples, but the present invention is not intended to be limited thereto.

1. Preparation of Resin Composition 1-1. Production of Polysaccharide Nanofiber

A solution where 1 g of TEMPO and 10 g of sodium bromide were dissolved was added to 5,000 g of BiNFi-s as a 2 mass % cellulose nanofiber dispersion liquid manufactured by Sugino Machine Limited. Subsequently, 600 g of an aqueous 2 mol/L sodium hypochlorite solution was dropwise added to initiate an oxidation reaction. The pH in the reaction was continued to be kept at 10 with addition of an aqueous sodium hydroxide solution. When the amount of the sodium hydroxide added reached 4.5 mmol/g based on the weight of the raw material cellulose on a dry basis, about 200 mL of ethanol was added to terminate the reaction. The dispersion liquid was subjected to defibrating at a pressure of 150 MPa by use of Nanovater as a wet high-pressure dispersion apparatus manufactured by Yoshida Kikai Co., Ltd. While it was confirmed that branching was increased according to an increase in the number of times of the defibrating treatment, the fiber length and the fiber size were not almost varied. The defibrating treatment was repeated until a predetermined rate of branching was achieved, thereby providing each aqueous dispersion liquid of cellulose nanofiber 1 to cellulose nanofiber 4.

In 5,000 g of distilled water was suspended 100 g of softwood Kraft pulp, and a solution where 1 g of TEMPO and 10 g of sodium bromide were dissolved in 500 g of distilled water was added thereto. Subsequently, 600 g of an aqueous 2 mol/L sodium hypochlorite solution was dropwise added to initiate an oxidation reaction. The pH in the reaction was continued to be kept at 10 with addition of an aqueous sodium hydroxide solution. When the amount of the sodium hydroxide added reached 4.5 mmol/g based on the weight of the raw material cellulose on a dry basis, about 200 mL of ethanol was added to terminate the reaction. Thereafter, filtration and washing with distilled water were repeated by use of a nylon mesh having a pore size of 20 μm, thereby providing oxidized pulp.

50 g of the oxidized pulp obtained was diluted with distilled water, thereby providing 5 L of a mixed solution. The mixed solution was subjected to defibrating at a pressure of 100 MPa by use of Nanovater as a wet high-pressure dispersion apparatus manufactured by Yoshida Kikai Co., Ltd. It was confirmed that the fiber length was shortened and branching was increased according to an increase in the number of times of the defibrating treatment. The number of times of the defibrating treatment was increased until a certain average fiber length was obtained, thereby providing each aqueous dispersion liquid of cellulose nanofiber 5 and cellulose nanofiber 6.

A mixed liquid where distilled water was added so that the amount of KC Flock (manufactured by Nippon Paper Industries Co., Ltd.) as a cellulose raw material was 0.02 wt % and the amount of sodium polyacrylate as a disperser was 0.005 wt % was subjected to defibrating at a pressure of 150 MPa by use of Nanovater as a wet high-pressure dispersion apparatus manufactured by Yoshida Kikai Co., Ltd. It was confirmed that the fiber length was shortened according to an increase in the number of times of the defibrating treatment. The number of times of the defibrating treatment was increased until a certain average fiber length was obtained, thereby providing each aqueous dispersion liquid of cellulose nanofiber 7 and cellulose nanofiber 8.

A sugarcane residue (bagasse) was added to distilled water, and the resultant was subjected to defibrating at a pressure of 150 MPa by use of Nanovater as a wet high-pressure dispersion apparatus manufactured by Yoshida Kikai Co., Ltd. The number of times of the defibrating treatment was changed, thereby providing two cellulose microfibrils. After a citrate buffer (pH 5.0) was added to each dispersion liquid of such cellulose microfibrils, heat-resistant endoglucanase (345 UI/g of bagasse) was added thereto, and stirred at a heating temperature of 85° C. for 96 hours, thereby providing each aqueous dispersion liquid of cellulose nanocrystal 1 and cellulose nanocrystal 2.

1-2. Evaluation of Polysaccharide Nanofiber

Cellulose nanofiber 1 to cellulose nanofiber 8, and cellulose nanocrystal 1 and cellulose nanocrystal 2 were each subjected to solvent replacement with methyl ethyl ketone, and the resultant was further diluted with methyl ethyl ketone until the concentration of each cellulose nanofiber or each cellulose nanocrystal reached about 0.001 to 0.0001 mass %. 20 μL of the diluted solution obtained was dropped onto a glass plate and dried, and imaged with a transmission electron microscope (TEM). 100 of polysaccharide nanofibers in an image obtained by imaging were adopted to measure the percentage of the branch-structured polysaccharide nanofiber on a number basis, the average fiber size of the polysaccharide nanofiber, the average fiber length of the polysaccharide nanofiber, and the aspect ratio of the polysaccharide nanofiber.

The addition average of the maximum size and the minimum size of a main branch constituting a polysaccharide nanofiber in the image obtained by imaging was defined as the fiber size of the polysaccharide nanofiber, and the addition average of the fiber sizes of the 100 of polysaccharide nanofibers was defined as each average fiber size of cellulose nanofiber 1 to cellulose nanofiber 8 and the cellulose nanocrystal.

The length between ends of a fiber constituting a main branch constituting a polysaccharide nanofiber in the image obtained by imaging was defined as the fiber length of the polysaccharide nanofiber, and the addition average of the fiber lengths of the 100 of polysaccharide nanofiber was defined as each average fiber length of cellulose nanofiber 1 to cellulose nanofiber 8 and the cellulose nanocrystal.

The value obtained by dividing the fiber length by the fiber size, with respect to a polysaccharide nanofiber in the image obtained by imaging, was defined as the aspect ratio of the polysaccharide nanofiber, and the addition average of the aspect ratios of the 100 of polysaccharide nanofibers was defined as each aspect ratio of cellulose nanofiber 1 to cellulose nanofiber 8 and the cellulose nanocrystal.

1-3. Production of Resin Composition

Cellulose nanofiber 1 to cellulose nanofiber 8 and cellulose nanocrystal 1 were each subjected to solvent replacement with methyl ethyl ketone, and the dispersion liquid obtained was mixed with trimethylolpropane triacrylate as an active energy ray-curable compound and diphenyl(2,4,6-trimethylbenzoyl)phosphine oxide as a photopolymerization initiator so that the concentration of the nanofiber relative to trimethylolpropane triacrylate was each concentration in Table 1. After the mixed liquid was dispersed by a homogenizer, methyl ethyl ketone was volatilized by an evaporator, thereby providing each of resin composition 1 to resin composition 12.

Trimethylolpropane triacrylate and diphenyl(2,4,6-trimethylbenzoyl)phosphine oxide were mixed at the same compositional ratio as those of resin composition 1 to resin composition 12, thereby providing resin composition 13 containing no nanofiber.

Table 1 shows the type of each nanofiber (cellulose nanofiber or cellulose nanocrystal) used in preparation of each of resin composition 1 to resin composition 13, and the percentage of the branch-structured nanofiber on a number basis relative to the nanofiber (in the Table, designated as "Rate of branching".), the average fiber size, the average fiber length, the aspect ratio, and the content of the nanofiber based on the mass of trimethylolpropane triacrylate (in the Table, designated as "Content".).

TABLE 1

Resin composition 1 to resin composition 13

| Resin composition No. | Type of nanofiber | Rate of branching (%) | Average fiber size (nm) | Average fiber length (μm) | Aspect ratio | Content (mass %) |
| --- | --- | --- | --- | --- | --- | --- |
| 1 | Cellulose nanofiber 1 | 0 | 25 | 1 | 40 | 20 |
| 2 | Cellulose nanofiber 2 | 8 | 25 | 1 | 40 | 20 |
| 3 | Cellulose nanofiber 3 | 18 | 25 | 1 | 40 | 20 |
| 4 | Cellulose nanofiber 4 | 22 | 25 | 1 | 40 | 20 |
| 5 | Cellulose nanofiber 3 | 8 | 25 | 1 | 40 | 0.05 |
| 6 | Cellulose nanofiber 3 | 8 | 25 | 1 | 40 | 90 |
| 7 | Cellulose nanofiber 5 | 5 | 2 | 1 | 500 | 20 |
| 8 | Cellulose nanofiber 6 | 5 | 2 | 20 | 10000 | 20 |
| 9 | Cellulose nanofiber 7 | 18 | 100 | 100 | 1000 | 20 |
| 10 | Cellulose nanofiber 8 | 18 | 100 | 1 | 10 | 20 |
| 11 | Cellulose nanocrystal 1 | 0 | 25 | 1 | 20 | 20 |
| 12 | Cellulose nanocrystal 2 | 0 | 25 | 0.25 | 10 | 20 |
| 13 | — | — | — | — | — | 0 |

2. Production of Three-Dimensional Shaped Article 2-1. Deposition Shaping Method A shaping tank included in a production apparatus of a three-dimensional shaped article, having a configuration illustrated in FIG. 2, was charged with each of resin composition 1 to resin composition 12, and irradiation with semiconductor laser light (output 100 mW, wavelength 355 nm) and descending of a shaping stage were repeated, thereby producing each of three-dimensional shaped article 1 to three-dimensional shaped article 12 each having a length (hereinafter, also simply referred to the length in the depth direction of the shaping tank: in the height direction of each three-dimensional shaped article as "length".) of 320 mm, a width of 10 mm, and a thickness of 4 mm.

Three-dimensional shaped article A was produced by use of resin composition 13 in the same manner.

2-2. Continuous Shaping Method

A shaping tank included in a production apparatus of a three-dimensional shaped article, having a configuration illustrated in FIG. 3, was charged with resin composition 2, and ascending of a support stage with irradiation with semiconductor laser light (output 100 mW, wavelength 355 nm) was made, thereby producing three-dimensional shaped article 13 having a length of 320 mm, a width of 10 mm, and a thickness of 4 mm.

The shaping tank had, as a window section at the bottom thereof, a plate having a thickness of 10 mm, made of TEFLON ("TEFON", registered trademark of DuPont) AF fluoropolymer as a material which allowed oxygen as a polymerization inhibitor to penetrate. The outside of the shaping tank was in an oxygen atmosphere and also irradiation with the semiconductor laser light was made with proper pressurizing, thereby allowing polymerization to stepwise progress in the buffer region in the height direction, and thus continuous shaping could be made.

Three-dimensional shaped article B was produced by use of resin composition 13 in the same manner.

3. Evaluation of Three-Dimensional Shaped Article 3-1. Variation in Strength

Each of three-dimensional shaped article 1 to three-dimensional shaped article 13 was divided into quarters in the height direction, and respective four test pieces each having a length of 80 mm, a width of 10 mm, and a thickness of 4 mm were obtained. Thereafter, the respective bending strengths of the four test pieces obtained were measured according to JIS K 7171. The distance L between pivot points was 64 mm, the testing speed v was 2 mm/min, and the radius R1 of an indenter was 5 mm.

Average value X of the bending strengths measured of the four test pieces, and standard deviation Y of the bending strengths measured of the four test pieces were determined, and the value of Y/X was used to evaluate the variation in strength in the height direction of each of three-dimensional shaped article 1 to three-dimensional shaped article 12, according to the following criteria.

A Y/X was 5% or less
B Y/X was more than 5% and 10% or less
C Y/X was more than 10% and 20% or less
D Y/X was more than 20%

The variation in strength in the height direction with respect to three-dimensional shaped article A was also evaluated in the same manner.

3-2. Rate of Enhancement in Strength

Three-dimensional shaped article A was divided into quarters in the height direction, and respective four test pieces each having a length of 80 mm, a width of 10 mm, and a thickness of 4 mm were obtained. The value of X/A obtained from average value A of the bending strengths of the four test pieces measured according to the method and average value X of the bending strengths measured of four test pieces obtained by division into quarters in the height direction of each of three-dimensional shaped article 1 to three-dimensional shaped article 12 was used to evaluate the rate of enhancement in strength of each of three-dimensional shaped article 1 to three-dimensional shaped article 12 due to polysaccharide nanofiber addition, according to the following criteria.

A X/A was more than 1.2
B X/A was more than 1.05 and 1.2 or less
C X/A was 1.05 or less Three-dimensional shaped article B was divided into quarters in the height direction, and respective four test pieces each having a length of 80 mm, a width of 10 mm, and a thickness of 4 mm were obtained. The value of X/B obtained from average value B of the bending strengths of the four test pieces measured according to the method and average value X of the bending strengths of four test pieces obtained by division into quarters in the height direction of three-dimensional shaped article 13 was used to evaluate the rate of enhancement in strength of three-dimensional shaped article 13 due to polysaccharide nanofiber addition, according to the same criteria as in three-dimensional shaped article 1 to three-dimensional shaped article 12.

Table 2 shows the production method, and evaluation results including the variation in strength and the rate of enhancement in strength, of each of three-dimensional shaped article 1 to three-dimensional shaped article 13.

TABLE 2

Evaluation of three-dimensional shaped article 1 to three-dimensional shaped article 13, and three-dimensional shaped article A

| Three-dimensional shaped article No. | Resin composition No. | Production method | Variation in strength | Rate of enhancement in strength |
|---|---|---|---|---|
| 1 | Resin composition 1 | Deposition shaping method | A | A |
| 2 | Resin composition 2 | Deposition shaping method | B | A |
| 3 | Resin composition 3 | Deposition shaping method | C | A |
| 4 | Resin composition 4 | Deposition shaping method | D | A |
| 5 | Resin composition 5 | Deposition shaping method | B | C |
| 6 | Resin composition 6 | Deposition shaping method | B | A |
| 7 | Resin composition 7 | Deposition shaping method | B | A |
| 8 | Resin composition 8 | Deposition shaping method | C | A |
| 9 | Resin composition 9 | Deposition shaping method | C | A |
| 10 | Resin composition 10 | Deposition shaping method | B | C |
| 11 | Resin composition 11 | Deposition shaping method | B | B |
| 12 | Resin composition 12 | Deposition shaping method | B | C |
| 13 | Resin composition 2 | Continuous shaping method | A | B |
| A | Resin composition 12 | Deposition shaping method | B | — |

As shown in Table 2, respective three-dimensional shaped articles produced by use of resin composition 1 to resin composition 3 and resin composition 5 to resin composition 11 each having the branch-structured polysaccharide nanofiber at a percentage of less than 20% on a number basis relative to the total of the polysaccharide nanofiber were small in the variation in strength in the height direction, and were significantly enhanced in strength as compared with three-dimensional shaped article A or three-dimensional shaped article B produced by use of a comparative resin composition containing no polysaccharide nanofiber.

In particular, respective three-dimensional shaped articles produced by use of resin composition 1 and resin composition 2 each having the branch-structured polysaccharide nanofiber at a percentage of less than 5% on a number basis relative to the total of the polysaccharide nanofiber were smaller in the variation in strength in the height direction.

On the other hand, a three-dimensional shaped article produced by use of resin composition 4 having the branch-structured polysaccharide nanofiber at a percentage of 20% or more on a number basis relative to the total of the polysaccharide nanofiber was larger in the variation in strength in the height direction.

A three-dimensional shaped article produced by use of resin composition 12 containing no polysaccharide nanofiber hardly caused the variation in strength in the height direction. Thus, it was presumed that the variation in strength in the height direction was caused by the nanofiber.

The present application claims the priority based on Japanese Patent Application No. 2017-003320 filed on Jan. 12, 2017, and the contents described in the appended claims, the specification, and the accompanying drawings of the application are herein incorporated.

INDUSTRIAL APPLICABILITY

The resin composition of the present invention enables a three-dimensional shaped article that is higher in strength and that more hardly causes the variation in strength in the height direction, to be produced. The resin composition of the present invention also enables a three-dimensional shaped article that hardly causes the variation in strength in the height direction even if irradiated with an active energy ray from the surface or the bottom surface thereof, to be produced. Thus, the present invention is expected to expand the range of applications of a three-dimensional shaped article produced by use of the resin composition, and to contribute to progression and spread of the technique in the art.

REFERENCE SIGNS LIST 100, 200, 300, 400 polysaccharide nanofiber
110, 210, 310, 410 main branch
220, 320, 420, 430 side branch
500 production apparatus
510 shaping tank
520 shaping stage
530 base
540 irradiation source
550 galvano mirror
600 production apparatus
610 shaping tank
615 window section
620 support stage
630 irradiation source
642 buffer region
644 curing region

The invention claimed is:

1. A resin composition to be used in production of a three-dimensional shaped article, the production including selectively irradiating a liquid resin composition with an active energy ray, thereby three-dimensionally forming a shaped article having the resin composition cured, wherein
the resin composition comprises an active energy ray-curable compound and a polysaccharide nanofiber, and includes a branch-structured polysaccharide nanofiber at a percentage of less than 20% on a number basis based on a total of the polysaccharide nanofiber.

2. The resin composition according to claim 1, wherein the resin composition includes the branch-structured polysaccharide nanofiber at a percentage of less than 10% on a number basis relative to the total of the polysaccharide nanofiber.

3. The resin composition according to claim 1, wherein the polysaccharide nanofiber has an average fiber size of 2 nm or more and 100 nm or less.

4. The resin composition according to claim 1, wherein the polysaccharide nanofiber has an average fiber length of 0.2 µm or more and 100 µm or less.

5. The resin composition according to claim 1, wherein the polysaccharide nanofiber has an aspect ratio of 10 or more and 10,000 or less.

6. The resin composition according to claim 1, wherein a percentage of a mass of the nanofiber based on a total mass of the active energy ray-curable compound is 0.05 mass % or more and 90 mass % or less.

7. The resin composition according to claim 1, wherein the polysaccharide nanofiber comprises nanocellulose.

8. The resin composition according to claim 7, wherein the nanocellulose comprises a cellulose nanofiber.

9. The resin composition according to claim 7, wherein the nanocellulose comprises a cellulose nanocrystal.

10. A production method for a three-dimensional shaped article, the method comprising selectively irradiating the resin composition according to claim 1 with an active energy ray, thereby three-dimensionally forming a shaped article having the resin composition cured.

11. The production method according to claim 10, the method comprising:
selectively irradiating the resin composition with an active energy ray, thereby forming a first shaped article layer, in a shaping tank,
feeding the resin composition onto a surface of the first shaped article layer,
selectively irradiating the resin composition fed, with an active energy ray, thereby forming a second shaped article layer having the fed resin composition cured, and depositing the second shaped article layer on the first shaped article layer, and
repeating feeding of the resin composition and deposition of the shaped article layer, thereby three-dimensionally forming a shaped article having the resin cured.

12. The production method according to claim 10, the method comprising
allowing an active energy ray to pass through a buffer region in which curing of the resin composition is inhibited by a polymerization inhibitor, and selectively irradiating a curing region which has a lower concentration of the polymerization inhibitor and in which the resin composition is curable, with the active energy ray, thereby curing the resin composition contained in the curing region, in a shaping tank, and
continuously irradiating the resin composition cured, with the active energy ray, with the resin composition cured being transferred in a vertical direction in the shaping tank, thereby three-dimensionally and continuously forming a shaped article having the resin composition cured.

13. The production method according to claim 12, wherein the curing region is irradiated with the active energy ray from a bottom surface of the shaping tank.

* * * * *